(12) United States Patent
Chow et al.

(10) Patent No.: US 9,535,908 B2
(45) Date of Patent: Jan. 3, 2017

(54) AUTO-RETRIEVING TO AVOID DATA BINDING

(75) Inventors: Weihsiung William Chow, Fullerton, CA (US); Boguslaw Ludwik Plewnia, Mission Viejo, CA (US); David J. Lovat, Huntington Beach, CA (US)

(73) Assignee: SHARP LABORATORIES OF AMERICA, INC., Camas, WA (US)

( * ) Notice: Subject to any disclaimer, the term of this patent is extended or adjusted under 35 U.S.C. 154(b) by 1006 days.

(21) Appl. No.: 12/497,411

(22) Filed: Jul. 2, 2009

(65) Prior Publication Data

US 2011/0004614 A1 Jan. 6, 2011

(51) Int. Cl.
*G06F 17/30* (2006.01)
*G06F 7/00* (2006.01)

(52) U.S. Cl.
CPC .............. *G06F 17/30011* (2013.01)

(58) Field of Classification Search
None
See application file for complete search history.

(56) References Cited

U.S. PATENT DOCUMENTS

| | | | |
|---|---|---|---|
| 6,289,460 B1 * | 9/2001 | Hajmiragha | G06F 17/30011 700/83 |
| 6,839,062 B2 | 1/2005 | Aronson et al. | |
| 7,080,066 B1 | 7/2006 | Scheurich et al. | |
| 7,174,342 B1 | 2/2007 | Scheurich et al. | |
| 7,184,967 B1 | 2/2007 | Mital et al. | |
| 7,467,371 B1 | 12/2008 | Meredith et al. | |
| 7,496,563 B2 | 2/2009 | Newbold et al. | |
| 7,849,053 B2 * | 12/2010 | Wolff et al. | 707/608 |
| 2004/0164987 A1 | 8/2004 | Aronson et al. | |
| 2004/0194033 A1 | 9/2004 | Holzwarth et al. | |
| 2004/0205462 A1 | 10/2004 | Levine | |
| 2005/0009050 A1 | 1/2005 | Nadeau et al. | |
| 2005/0066287 A1 | 3/2005 | Tattrie et al. | |
| 2005/0071209 A1 | 3/2005 | Tatavu et al. | |
| 2005/0076330 A1 | 4/2005 | Almgren et al. | |
| 2005/0144192 A1 * | 6/2005 | Chkodrov et al. | 707/102 |
| 2005/0157341 A1 | 7/2005 | Levine | |
| 2006/0031253 A1 | 2/2006 | Newbold et al. | |
| 2006/0158463 A1 | 7/2006 | Michlin | |
| 2007/0073572 A1 | 3/2007 | McLaughlin et al. | |
| 2007/0156486 A1 * | 7/2007 | Sanabria et al. | 705/8 |
| 2007/0276689 A1 | 11/2007 | Slone et al. | |
| 2008/0072225 A1 * | 3/2008 | Nagatsuka | G06F 17/30867 718/100 |
| 2008/0114810 A1 | 5/2008 | Malek et al. | |
| 2010/0250487 A1 * | 9/2010 | Gabriel et al. | 707/608 |

FOREIGN PATENT DOCUMENTS

| | | |
|---|---|---|
| JP | 2001-216319 | 8/2001 |
| JP | 2004-163997 | 6/2004 |
| JP | 2008-140378 | 6/2008 |

(Continued)

*Primary Examiner* — Sangwoo Ahn
(74) *Attorney, Agent, or Firm* — Brooks Acordia IP Law, PC; Pejman Yedidsion; David Ripma (57) ABSTRACT

Machine-enabled methods of, and devices and systems for, workflow instance execution, particularly document storing and retrieving based on at least one of: a document type, a document source activity identifier, an activity type, and document metadata.

21 Claims, 7 Drawing Sheets

(56) References Cited

FOREIGN PATENT DOCUMENTS

| WO | WO 2004/095309 A2 | 11/2004 |
| WO | WO 2004/095309 A3 | 11/2004 |
| WO | WO 2007/134265 A2 | 11/2007 |
| WO | WO 2007/134265 A3 | 11/2007 |
| WO | WO 2008/075304 A1 | 6/2008 |

\* cited by examiner

AUTO-RETRIEVING TO AVOID DATA BINDING

FIELD OF ENDEAVOR

The present invention, in its several embodiments, relates to methods, devices and systems for data processing of documents, and particularly pertains to storing and retrieving data across workflow activities of a workflow instance.

BACKGROUND

In workflow type applications that have multiple stages, or activities, it is common that a particular processing stage of the workflow, i.e., a particular activity, depends on data that has been produced at any of the earlier processing stages or activities. Workflow applications, or workflow instances, typically require that data be passed from one stage, step, or activity, to another in a sequential manner. Identifying a linkage for passing the data is commonly referred to as "data binding." In a typical workflow instance the data binding requires knowledge of system names to be used for the binding of data components to activities within a workflow application. Often, at a given processing stage, the designer of the application or the application user must instruct the workflow application as to what the input document or documents to be processed at this stage are. A novice application user or application designer, when setting up the workflow application, may not be sufficiently cognizant of the requisite system names for effective data binding, and the challenges to the user grow as the binding task is further complicated by increasing complex data structures.

SUMMARY

The invention, in its several embodiments, includes machine-enabled methods of, and devices and systems for workflow instance execution, particularly workflow instance execution that may include document storing and retrieving based on at least one of: a document type, and/or a document source activity identifier.

Document metadata may be characterized as including a "document type" and a "source activity name." A designation of a "document type" may be used to indicate origins of a document. Accordingly, a "document type" may include: (a) a scanned document—an electronic document or document file generated via an MFP-scanned document; (b) an OCR document—an electronic document or document file generated by an application of an optical character recognition tool to an image having one or more characters; (c) an XML document—a document file comprising data in an XML format; and/or (d) an image document—a document file generated via image processing. A designation of "source activity name" may be defined as a name uniquely applied to a particular activity from which a document is generated.

A process embodiment of the present invention may comprise the steps of (and not necessarily in the order of): (a) optionally defining or designating a store location or a storage container for current workflow instance; (b) receiving document and its metadata associated with the one or more documents into the document set as an output document of an input activity; (c) selecting, by an output activity, the one or more documents from the document set for input by designating the document metadata corresponding to the one or more documents; and (d) selecting, by a processing activity, the one or more documents from the document set to input by designating the corresponding document metadata. After the processing task is completed, the process activity may output, into the document set, the one or more documents with their respective document metadata.

A workflow instance of embodiments of the present invention may comprise a document set. A document set may be stored in addressable memory comprising the one or more documents and their metadata associated with a current workflow instance. An input activity may be defined as an activity that, while not necessarily requiring a document as input, may produce one or more documents that may be output from the input activity to a document set, and the output document may be stored for, and accessed by, workflow downstream activities. An output activity may be defined as an activity that takes one or more documents produced from upstream activities of the workflow, as input documents with which to perform work according to instructions. An example of an output activity is a "SendEmail" activity that sends email with an attachment. The attachment is a document input from a document set into this exemplary output activity, and the result is that the document is sent via email, for this example. A processing activity may be defined as an activity that gets, as input, one or more documents in a document set, e.g., documents produced from upstream activities and stored, process the input, i.e., do some work, and output the one or more documents to a documents set for subsequent access by downstream activities. An exemplary embodiment of the machine-based method of workflow instance execution based on stored data may comprise: outputting by a workflow instance on a computing device, to an output store, a document comprising a specified attribute of at least one of: a document type and a document source activity identifier; and retrieving by the workflow instance from the output store a document based on at least one of: a document type and a document source activity identifier of the retrieved document.

BRIEF DESCRIPTION OF THE DRAWINGS

Embodiments of the present invention are illustrated by way of example and not limitation in the figures of the accompanying drawings, and in which.

DETAILED DESCRIPTION

Figures 1, 2B:
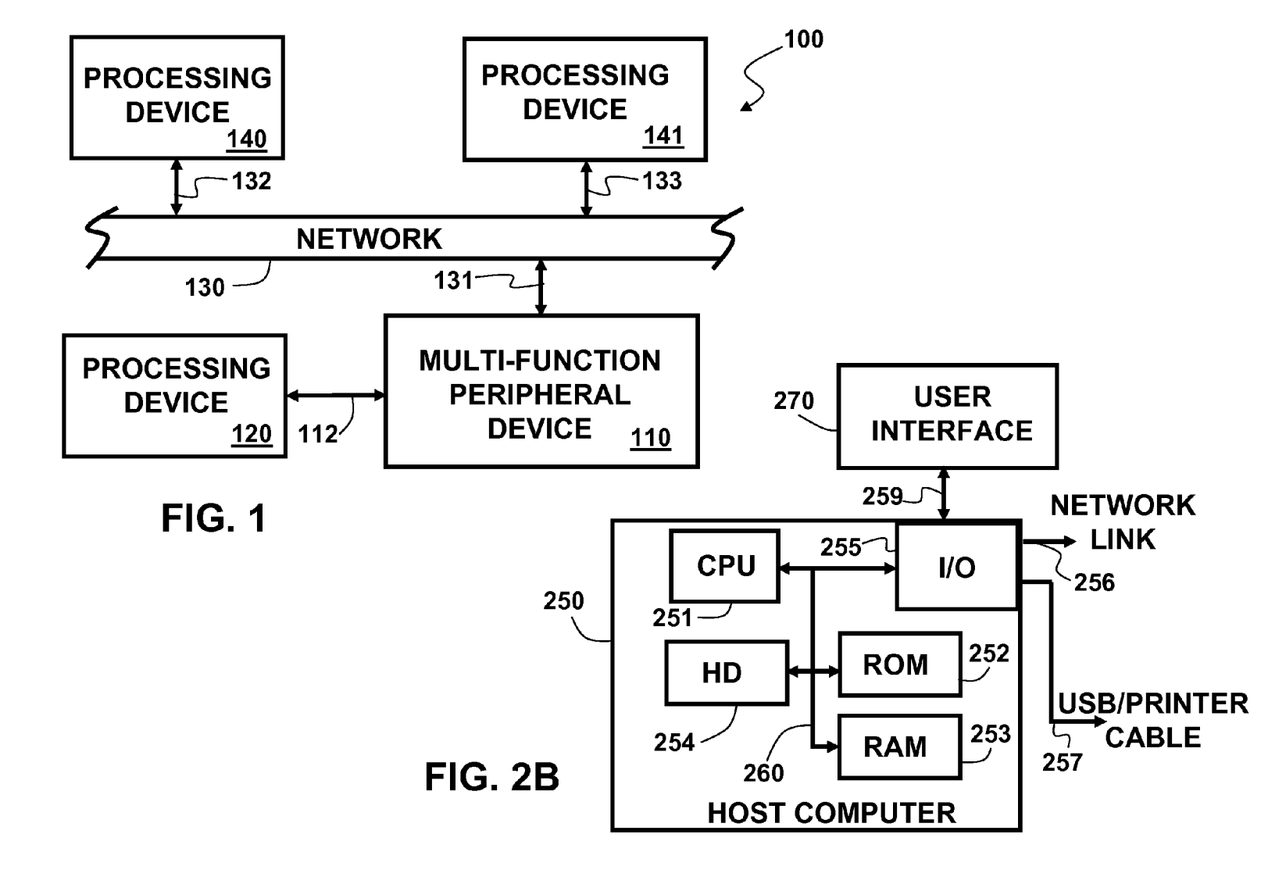
FIG. 1 illustrates, at a top level, an exemplary system comprising a plurality of processing devices in communication with a multi-function peripheral (MFP) device.
FIG. 2B illustrates a top level functional block diagram of an exemplary host computer that may host a driver embodiment of the present invention.

FIG. 1 illustrates an exemplary system embodiment 100 of the present invention where a printing device or a multi-functional peripheral (MFP) device 110 may be in direct communication 112 with a processing device 120, such as a computer hosting one or more drivers applicable to the printing device or multi-functional peripheral device 110. In addition, via a network 130 and a network link 131-133, the printing device or a multi-functional peripheral device 110 may be in communication with one or more processing devices 140, 141, such as one or more computers that may each host one or more drivers applicable to the printing device or the MFP device 110.

Figure 2A:
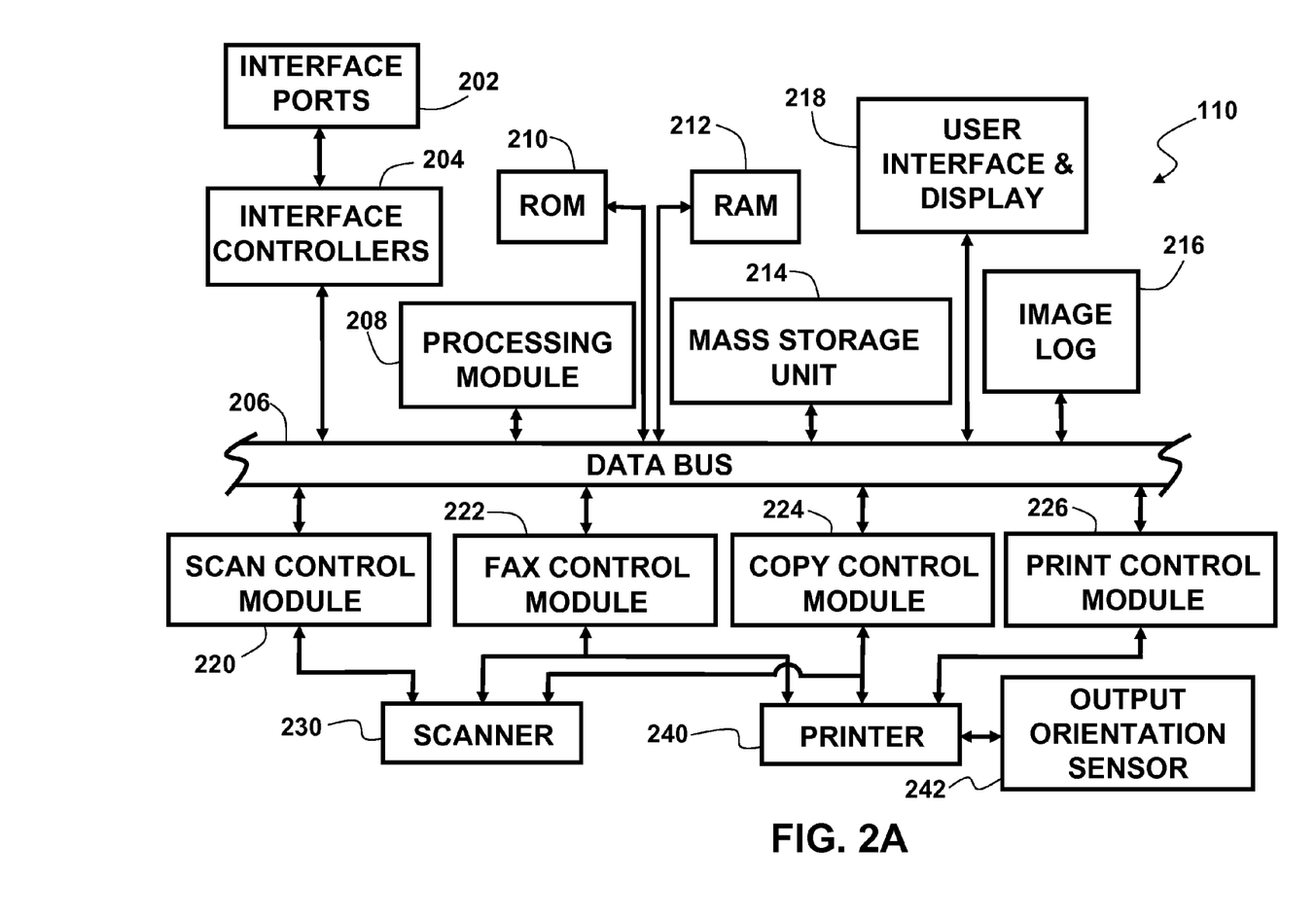
FIG. 2A illustrates a top level functional block diagram of an exemplary MFP device.

The exemplary printing device or MFP device 110 of FIG. 1 may be illustrated in greater exemplary functional detail in FIG. 2A. Interface ports 202 may be present to connect a printer cable, a network link, or an external wireless module. The interface ports 202 may be serviced by one or more interface controllers 204 that function to direct communications and/or condition signals between the respective interface port 202 and one or more modules of the MFP device 110 which may be in common communication via a data bus 206. The MFP device 110 may include one or more processing modules 208 that may draw data from read-only memory (ROM) 210 and exchange data with random access memory (RAM) 212 and may store files having sizes greater than the RAM 212 capacity in one or more mass storage units 214. The MFP device 110 may maintain a log of its images 216 and have a user display and interface 218. The image log 216 may be a separate module or distributed, for example, with a portion executed via the processing module 208 that may access parameters, files, and/or indices that may be stored in ROM 210, RAM 212, a mass storage unit 214 or in combination thereof. The MFP device 110 may include as individual or separate modules a scan control module 220, a facsimile (FAX) control module 222, and a copy control module 224 where each module may service the scanner 230 to direct communications and/or condition signals between the scanner 230 and one or more modules of the MFP device 110, for example, via the data bus 206. The MFP device 110 may include as individual or separate modules the FAX control module 222, the copy control module 224 and a print control module 226 where each module may service the printer 240 to direct communications and/or condition signals between the printer 240 and the one or more modules of the MFP device 110, for example, via the data bus 206. The exemplary MFP device 110 may store a calibration table in ROM 210, RAM 212, a mass storage unit 214 or in combination thereof and accordingly, the calibration table may be accessed by the print control module 226 and/or a processing module 208 and made available to devices external to the MFP device 110 via one or more interface ports 202. The exemplary MFP device 110 may have notice, for example, due to a user input via the user interface 218 or sensed by an output orientation sensor 242 of the printer 240 and may be communicated via the print control module 226 to devices external to the MFP device 110 via one or more interface ports 202. FIG. 2B illustrates a top level functional block diagram of a processing device that is an exemplary host computer 250 that may host a driver embodiment of the present invention that, via an input/output interface 255 may interface 259 with the exemplary MFP of FIG. 2A via a wireless or wired network link 256 or a parallel, serial, or universal serial bus (USB) cable 257. The user interface 270 may include tactile input via keyboard, mouse and/or touch screen and/or audio input via a microphone. The user interface 270 may provide output to the user via a display, e.g. a graphical user interface (GUI), and/or provide audio output to the user via one or more speakers, headphones or ear buds. The host computer 250 may further comprise a central processing unit (CPU) 251, read only memory (ROM) 252, random access memory (RAM) 253 and a mass storage unit 254, such as a hard disk drive. Two or more elements of the host computer 250 may be in communication via a data bus 260. The general accessing of data, processing of data and communication and display of data may be handled at the CPU level of the host computer 250 by an operating system such as MICROSOFT™ WINDOWS™.

Figure 3A:
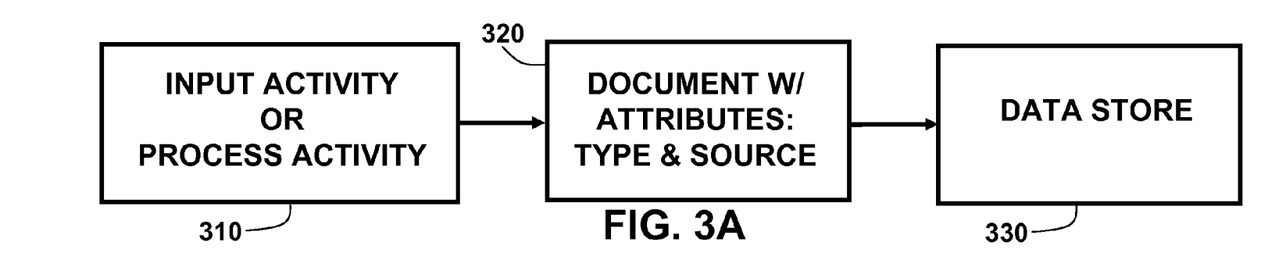
FIGS. 3A, 3B and 3C are top-level block diagrams of the flow of values associated with activities stored and/or retrieved from a document set.
Figure 3B:
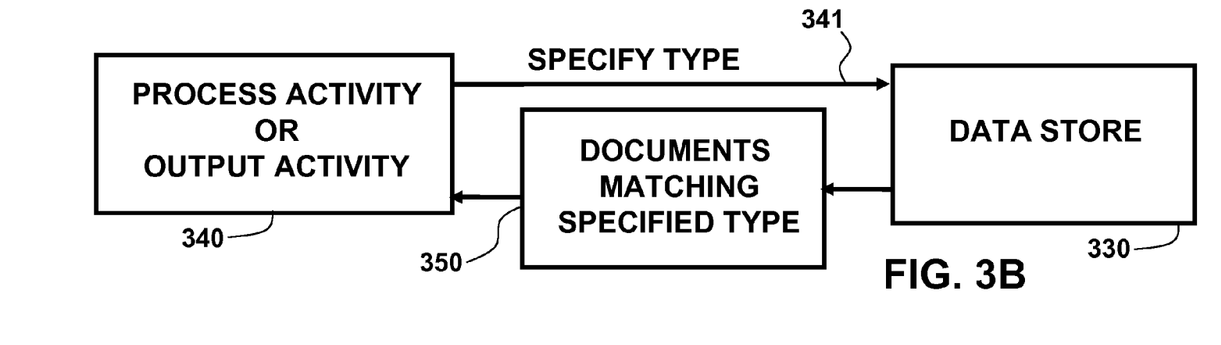
Figure 3C:
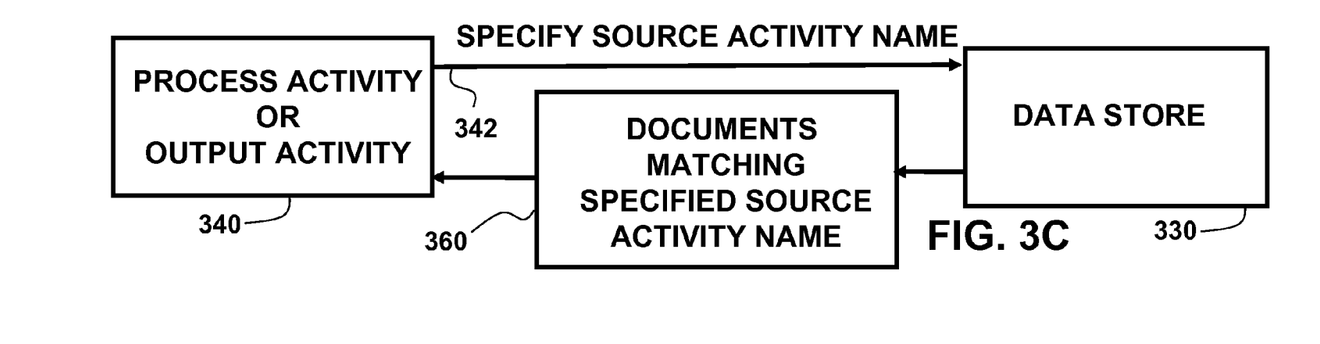

FIG. 3A is a top-level functional block diagram showing an input activity or a process activity 310 that may provide as output 320 a document, such as a data document, comprising attributes of type and source. The output 320 may be stored as part of a data store 330. FIG. 3B is a top-level functional block diagram showing a process activity or an output activity 340 specifying a document type 341 to the data store 330. The exemplary specification may serve as a query and return one or more documents of the document set that match the specified type 350. FIG. 3C is a top-level functional block diagram showing a process activity or an output activity 340 specifying a source activity, e.g., an input activity or a process activity, by name 342, to the data store 330. The exemplary specification may serve as a query and return one or more documents of the data store that match the specified source activity name 360.

For purposes of illustration, activities may be categorized as input activities, process activities, and output activities. An input activity may produce one or more documents, i.e., generates one or more documents for use by workflow downstream activities, and puts the produced documents into a document set. An input activity is typically not an activity that takes a document from the document set as input. A processing activity may get one or more documents from the document set of the current workflow instance as input and the processing activity may generate one or more output documents which may be put into a document set that may be available for downstream ctivities. An output activity may get one or more input documents from the document set and perform operations according to its respective instructions. An output activity may generate results for the workflow, but may not place a document into the document set. Documents placed into document sets may have two attributes: (a) the type of the document; and (b) the name of the source activity that generated the document. Accordingly, when processing activities or output activities need one or more documents as input, they must either specify the one or more types of the documents to input and/or specify the source activity name. In the first case, the documents of the selected types in the document set may be fetched by the activity. In the second case, the documents generated by the specific activity may be fetched by the current running activity. An activity itself may execute filtering instructions to remove one or more unwanted fetched documents.

Figure 4:
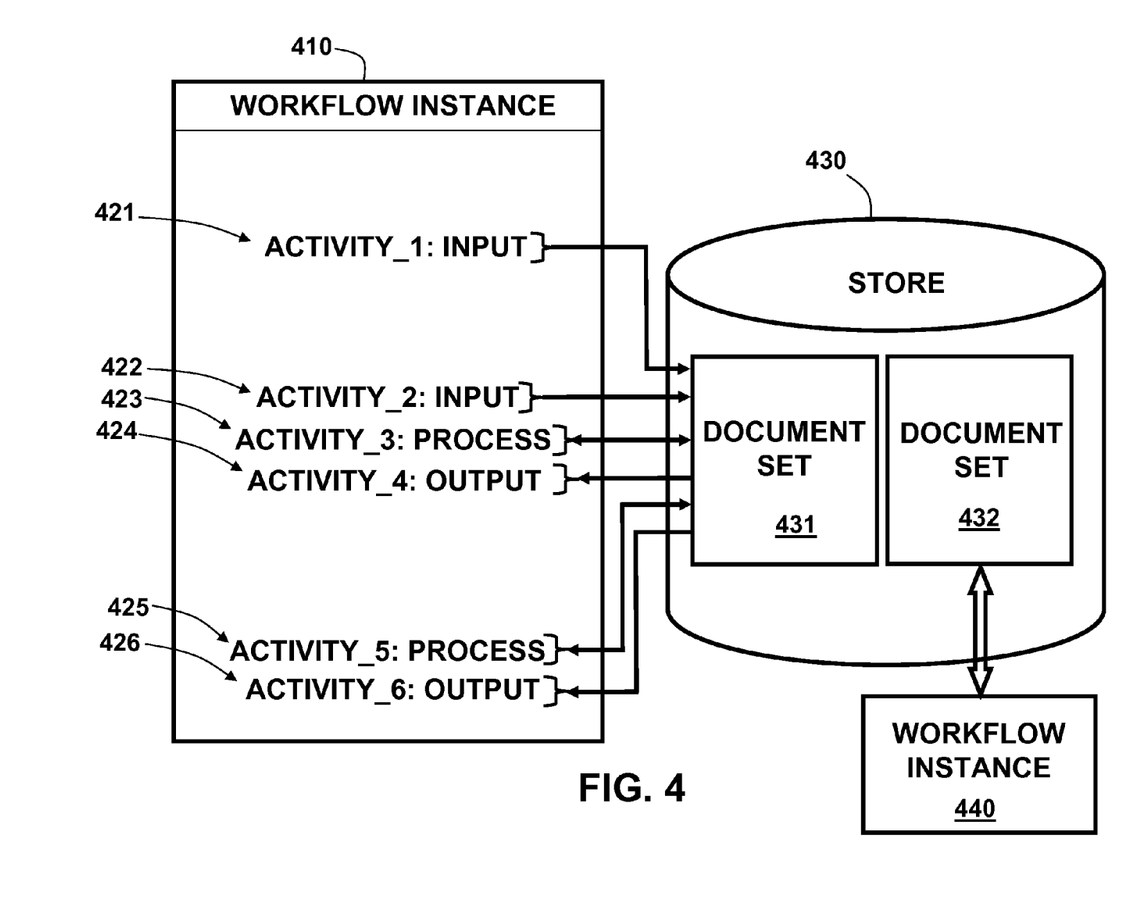
FIG. 4 is an exemplary functional block diagram of an embodiment of the present invention.

Generally, a workflow instance may comprise one or more activities or stages. FIG. 4 is an exemplary functional block diagram of a workflow instance 410 comprising activities. Workflow activity_1 421 provides an input to a data store 430, particularly a document set 431 for the workflow instance 410. Workflow activity_2 422 is shown as an input activity that provides an input to the document set 431 of the data store 430. Workflow activity_3 423 is shown as a process activity that provides an input to, and receives a stored output from, the document set 431 of the data store 430. Workflow activity_4 424 is shown as an output activity that receives a stored output from the document set 431 of the data store 430. Workflow activity_5 425 is shown as a process activity that provides an input to, and receives a stored output from, the document set 431 of the data store 430. Workflow activity_6 426 is shown as an output activity that receives a stored output from the document set 431 of the data store 430. Accordingly, a separate workflow instance 440 may send or receive data from its own document set 432 of the data store 430 and/or a separate data store (not shown).

Figure 5:
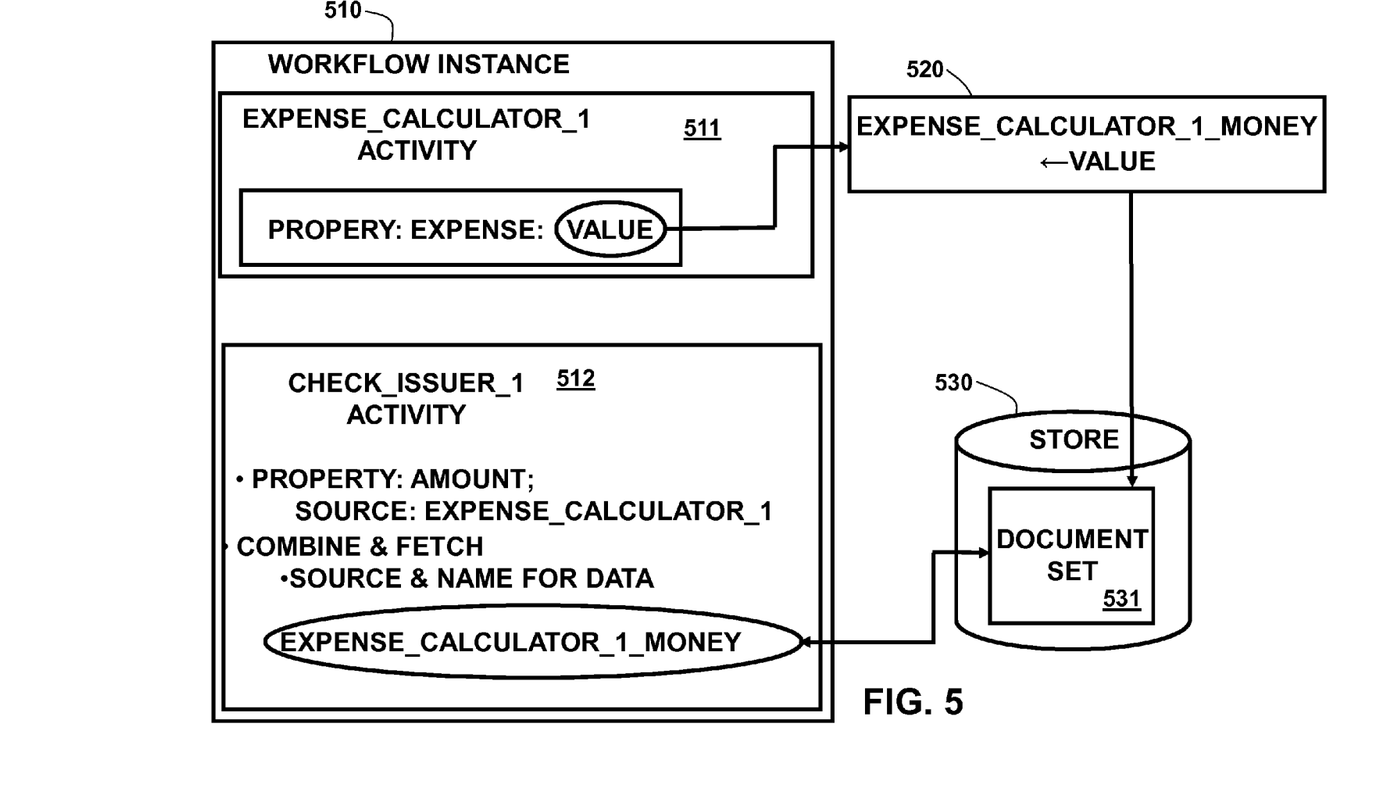
FIG. 5 is an exemplary functional block diagram of an embodiment of the present invention.

An example of a workflow instance 510 comprising a data generating-activity and a data-consuming activity may be illustrated by an exemplary Expense Calculator activity and a Check Issuer activity of FIG. 5. The Check Issuer activity 512 has an "Amount" property that needs the value from the "Expense" property of the Expense Calculator activity 511. One may define the suffix of a pair of related data labeled or named "Money." In this example, a "qualified name" for labeling purposes is a unique name that may be used to identify particular data in a specific context. During the workflow execution, after calculating the expense 520, the Expense Calculator 511, as instructions executed by a processing device and addressable memory, may write the "Expense" property value into the storage container 530 with a prefix similar to activity's qualified name, e.g., "ExpenseCalculator1."

After combining the prefix and suffix, the name of the data in the storage container that is equal to the Expense property value of the Expense Calculator activity will be "ExpenseCalculator1Money". At run time, the Check Issuer activity 512 may query the document set 531 of the data store 530 for the value of the "Amount" property by setting the prefix equal to the activity name of source activity. In this example, the prefix will be "ExpenseCalculator1". At run time, the Check Issuer activity 512 may combine the prefix and suffix to form the name "ExpenseCalculator1Money." Thereafter, the Check Issuer activity 512 may retrieve the data specified by the same name from the document set 531 of the data store 530.

Figure 6:
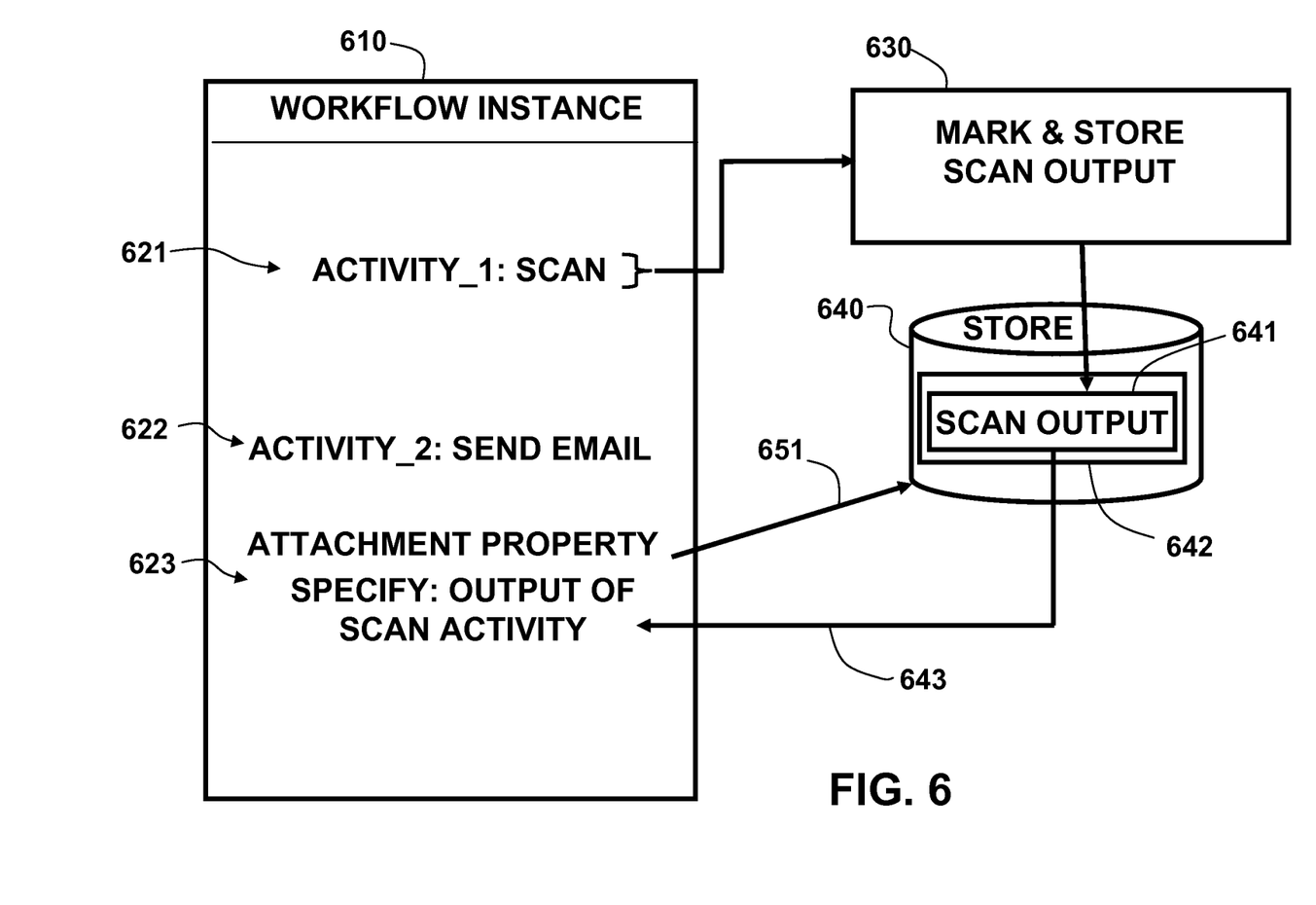
FIG. 6 is an exemplary functional block diagram of an embodiment of the present invention.

FIG. 6 is an exemplary functional block diagram of a workflow instance 610 that comprises a Scan activity 621, and a Send Email activity 622. With reference to FIG. 4 and FIG. 6 taken together, the Scan activity 621 may be categorized as an input activity, the Send email activity 622 may be categorized as an output activity. The scanned document generated from the scan activity may be marked 630 as a Scanned document type and saved in the document set 642. Accordingly, at runtime when the Send email activity 622 executes, the scanned document may be readily located 651 in the document set 642 and fetched 643 by the Send email activity 622. This document 641 will be attached in the email sent by the Send email activity 622. The Send email activity 622 may include an attachment property to specify one or more kinds of one or more documents that may be required to be attached in an email. A predefined data store 640 configured to store the output document from the Scan activity after the scan output data is marked, named, tagged, or labeled for retrieval at the store 640 as a scan document type output 641. At application run time, the Send Email activity 622 may search the predefined storage for the document marked as a scanned document and attach it to send. In this example, the attachment property may specify a scanned document so the document generated from the scan activity 621 may be attached in the email via an attachment property 623. Accordingly, the workflow need not necessarily specify an action to bind the data output from the Scan activity 621 with the data input to Send Email activity 622. Rather, the instructions may specify in the Send Email activity 622 the kind of document that is to be attached in the email.

Figure 7:
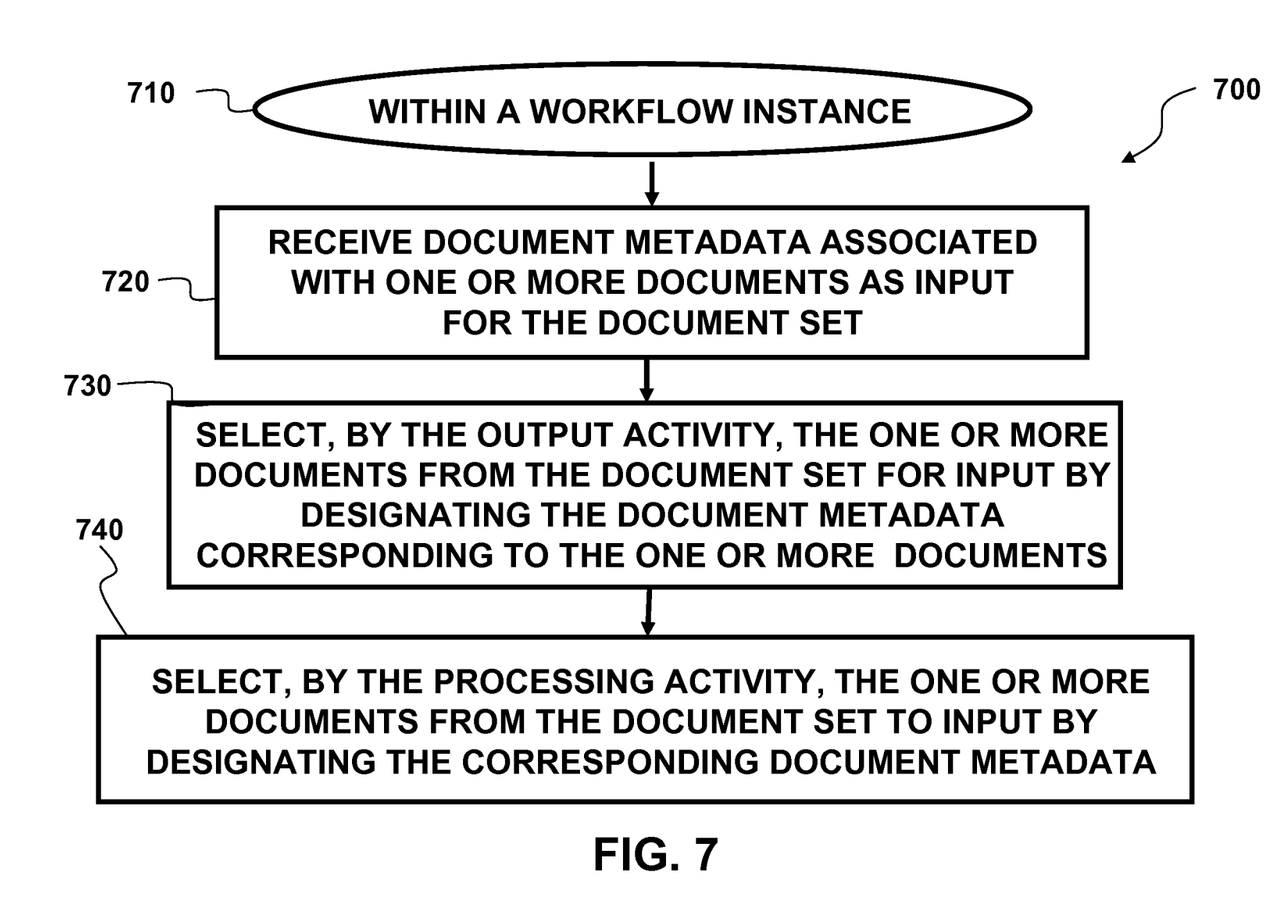
FIG. 7 is a top level flowchart of an embodiment of the present invention.

FIG. 7 is a top level flowchart of a process embodiment 700 of the present invention within a workflow instance (step 710) that may comprise a computing device executing the steps of (and not necessarily in the order of): (a) receiving document metadata associated with the one or more documents into the document set as input (step 720); (b) selecting, by the output activity, the one or more documents from the document set for input by designating the document metadata corresponding to the one or more documents (step 730); and (c) selecting by the processing activity, the one or more documents from the document set to input by designating the corresponding document metadata (step 740). After the processing task is completed, the process activity may output, into the document set, the one or more documents with their respective document metadata. Some process embodiments have the designating of the document metadata corresponding to the one or more documents being received as workflow author input, instead of an output activity designation and/or instead of a processing activity, when the workflow is being designed or when the workflow is being configured.

One of ordinary skill in the art will also appreciate that the elements, modules, and functions described herein may be further subdivided, combined, and/or varied and yet still be in the spirit of the embodiments of the invention. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A method comprising:
   outputting by a workflow instance on a computing device, to an output store, a document comprising a specified attribute of a document source activity identifier, wherein the specified attribute of the document source activity identifier is combined with a unique source activity name;
   retrieving by the workflow instance from the output store at runtime, a document based on a provided combination of the document source activity identifier and the unique source activity name, wherein the retrieving of the document is based on a query for matching the unique source activity name across workflow activities; and
   executing the workflow instance based on stored data associated only with the workflow instance, wherein the work flow instance execution does not perform an action to bind the document outputted by the workflow instance with the document retrieved by the workflow instance wherein the action to bind requires knowledge of information to be used for binding of data components to activities within a workflow instance, thereby retrieving documents across workflow activities of the workflow instance at runtime and without the retrieving workflow instance having prior knowledge of the outputting workflow instance.

2. The method of claim 1 further comprising
receiving, as input into a document set of the workflow instance, one or more documents from an input activity, the input comprising: document metadata associated with the one or more documents comprising the document set;
selecting, by an output activity of the workflow instance, the one or more documents from the document set for input by designating the document metadata corresponding to the one or more documents; and
selecting, by a processing activity of the workflow instance, the one or more documents from the document set to input by designating the corresponding document metadata.

3. The method of claim 1 further comprising
designating a store location or a storage container for the workflow instance.

4. The method of claim 2 further comprising:
filtering, by a processing activity of the workflow instance, the one or more documents from the document set by executing instructions to remove unwanted retrieved documents.

5. The method of claim 1 wherein the document set associated with the workflow instance comprises a set of one or more documents.

6. The method of claim 5 wherein the retrieving of the document based on the document source activity identifier of the retrieved document, by the workflow instance, is based on a set of instructions.

7. The method of claim 1 further comprising:
determining a document set, the document set comprising one or more members of a set of outputted documents, wherein the document set is associated with the workflow instance.

8. The method of claim 1 wherein the specified attribute of the document source activity identifier is a unique source activity name.

9. A computing device comprising:
a processing unit and addressable memory; the processing unit configured to:
execute workflow instance based on stored data associated only with the workflow instance and workflow activities wherein the work flow instance execution does not perform an action to bind documents outputted by the workflow instance with documents retrieved by the workflow instance wherein the action to bind requires knowledge of information to be used for binding of data components to activities within a workflow instance, thereby retrieving documents across workflow activities of the workflow instance at runtime and without a retrieving workflow instance activity having prior knowledge of an outputting workflow instance activity;
output by the workflow instance on the computing device, to an output store, a document comprising a specified attribute of a document source activity identifier, wherein the specified attribute of the document source activity identifier is combined with a unique source activity name; and
retrieve by the workflow instance from the output store at runtime, the document based on a provided combination of the document source activity identifier and the unique source activity name, wherein the retrieving of the document is based on a query to match the unique source activity name across workflow activities of the workflow instance at runtime.

10. A processor readable non-transitory medium having processor executable instructions thereon, which when executed by a processor cause the processor to:
execute workflow instance based on stored data associated only with the workflow instance and workflow activities wherein the work flow instance execution does not perform an action to bind documents outputted by the workflow instance with documents retrieved by the workflow instance wherein the action to bind requires knowledge of information to be used for binding of data components to activities within a workflow instance, thereby retrieving documents across workflow activities of the workflow instance at runtime and without a retrieving workflow instance activity having prior knowledge of an outputting workflow instance activity;
output by the workflow instance on the computing device, to an output store, a document comprising a specified attribute of a document source activity identifier, wherein the specified attribute of the document source activity identifier is combined with a unique source activity name; and
retrieve by the workflow instance from the output store at runtime, the document based on a provided combination of the document source activity identifier and the unique source activity name, wherein the retrieving of the document is based on a query to match the unique source activity name across workflow activities of the workflow instance at runtime.

11. The processor readable non-transitory medium of claim 10 having processor executable instructions thereon, which when executed by a processor further cause the processor to:
receive, as input into a document set of the workflow instance, one or more documents from an input activity of the workflow instance, the input comprising: document metadata associated with the one or more documents comprising the document set;
select, by an output activity of the workflow instance, the one or more documents from the document set for input by designating the document metadata corresponding to the one or more documents; and
select, by a processing activity of the workflow instance, the one or more documents from the document set to input by designating the corresponding document metadata.

12. The processor readable non-transitory medium of claim 11 having processor executable instructions thereon, which when executed by a processor further cause the processor to designate a store location or a storage container for the workflow instance.

13. A method of workflow instance execution based on stored data associated only with the workflow instance, the method comprising:
receiving, as input into a document set of the workflow instance, one or more documents from an input activity, the input comprising: document metadata associated with the one or more documents, the document metadata comprising a type and a source of the document, wherein the input activity generates the one or more documents for use by workflow activities downstream;
selecting, by an output activity of the workflow instance, the one or more documents from the document set for input by designating the document metadata corresponding to the one or more documents and performing operations according to a set of instructions associated with the workflow instance, wherein the selecting is based on a query to return one or more documents of the document set that match the document metadata; and selecting, by a processing activity of the workflow instance, the one or more documents from the document set to input by designating the corresponding document metadata, wherein the selecting by the processing activity is based on specifying the type of the document to input and an activity name that is the source of the document;

wherein the selecting of the one or more documents across workflow activities of the workflow instance is done at runtime and without a workflow instance activity having prior knowledge of another workflow instance activity.

14. The method workflow execution of claim 13 further comprising designating a store location or a storage container for the workflow instance.

15. A computing device comprising:
a processing unit and addressable memory; the processing unit configured to:
execute workflow instance based on stored data associated only with the workflow instance;
receive, as input into a document set of the workflow instance, one or more documents from an input activity of the workflow instance, the input comprising: document metadata associated with the one or more documents, the document metadata comprising a type and a source of the document, wherein the input activity generates the one or more documents for use by workflow activities downstream;
select, by an output activity of the workflow instance, the one or more documents from the document set for input by designating the document metadata corresponding to the one or more documents and perform operations according to a set of instructions associated with the workflow instance, wherein the selection is based on a query to return one or more documents of the document set that match the document metadata; and
select, by a processing activity of the workflow instance, the one or more documents from the document set to input by designating the corresponding document metadata, wherein the selection by the processing activity is based on to specify the type of the document to input and an activity name that is the source of the document;
wherein the selecting of the one or more documents across workflow activities of the workflow instance is done at runtime and without a workflow instance activity having prior knowledge of another workflow instance activity.

16. The processing unit of the computing device of claim 15 further configured to designate a store location or a storage container for the workflow instance.

17. A processor readable non-transitory medium having processor executable instructions thereon, which when executed by a processor cause the processor to:
execute workflow instance based on stored data associated only with the workflow instance;
receive, as input into a document set of the workflow instance, one or more documents from an input activity of the workflow instance, the input comprising: document metadata associated with the one or more documents, the document metadata comprising a type and a source of the document, wherein the input activity generates the one or more documents for use by workflow activities downstream;
select, by an output activity of the workflow instance, the one or more documents from the document set for input by designating the document metadata corresponding to the one or more documents and perform operations according to a set of instructions associated with the workflow instance, wherein the selection is based on a query to return one or more documents of the document set that match the document metadata; and
select, by a processing activity of the workflow instance, the one or more documents from the document set to input by designating the corresponding document metadata, wherein the selection by the processing activity is based on to specify the type of the document to input and an activity name that is the source of the document;
wherein the selecting of the one or more documents across workflow activities of the workflow instance is done at runtime and without a workflow instance activity having prior knowledge of another workflow instance activity.

18. A method of workflow instance execution, wherein each separate workflow instance is associated only with a document set of the particular separate workflow instance, the method comprising:
outputting by a first workflow instance on a computing device, to an output store, a document from a first document set of the output store, the first document set comprising a specified attribute of a document source activity identifier, wherein the specified attribute of the document source activity identifier is combined with a unique source activity name; and
retrieving by the first workflow instance from the output store at runtime, a document from the first document set, based on the document source activity identifier of the retrieved document in combination with the unique source activity name, wherein the retrieving of the document is based on a query for matching the unique source activity name across workflow activities;
wherein the work flow instance does not perform an action to bind documents outputted by the workflow instance with documents retrieved by the workflow instance wherein the action to bind requires knowledge of information to be used for binding of data components to activities within a workflow instance, thereby retrieving documents across workflow activities of the workflow instance at runtime and without a retrieving workflow instance activity having prior knowledge of an outputting workflow instance activity.

19. The method of claim 18 further comprising:
outputting by a second workflow instance on a computing device, to a second output store, a document from a second document set of the second output store, the second document set comprising a specified attribute of a second document source activity identifier; and
retrieving by the second workflow instance from the second output store a document from the second document set, based on the second document source activity identifier of the retrieved document.

20. The method of claim 18 further comprising:
receiving, as input into the first document set of the first workflow instance, one or more documents from an input activity, the input comprising: document metadata associated with the one or more documents comprising the document set;

selecting, by a processing activity of the first workflow instance, the one or more documents from the first document set to input by designating the corresponding document metadata; and selecting, by an output activity of the first workflow instance, the one or more documents from the first document set for input by designating the document metadata corresponding to the one or more documents.

21. The method of claim 19 further comprising:

receiving, as input into the second document set of the second workflow instance, one or more documents from an input activity, the input comprising: document metadata associated with the one or more documents comprising the document set;

selecting, by a processing activity of the second workflow instance, the one or more documents from the second document set to input by designating the corresponding document metadata; and selecting, by an output activity of the second workflow instance, the one or more documents from the second document set for input by designating the document metadata corresponding to the one or more documents.

* * * * *